(12) United States Patent
Heger et al.

(10) Patent No.: US 9,156,404 B2
(45) Date of Patent: Oct. 13, 2015

(54) ADAPTER FOR PRECISE AND ACCURATE ATTACHMENT OF A MIRROR UNIT TO A SUPPORT ARM

(75) Inventors: Sebastian Heger, Bad Windsheim (DE); Werner Lang, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 1156 days.

(21) Appl. No.: 13/009,921

(22) Filed: Jan. 20, 2011

(65) Prior Publication Data

US 2011/0176235 A1   Jul. 21, 2011

(30) Foreign Application Priority Data

Jan. 20, 2010   (DE) .......................... 10 2010 001 063

(51) Int. Cl.
  *B60R 1/06*     (2006.01)
  *G02B 7/182*    (2006.01)
  *B60R 1/072*    (2006.01)
  *G02B 7/198*    (2006.01)

(52) U.S. Cl.
  CPC ............... *B60R 1/0605* (2013.01); *B60R 1/072* (2013.01); *G02B 7/182* (2013.01); *G02B 7/198* (2013.01)

(58) Field of Classification Search
  CPC ........ B60R 1/06; B60R 1/0605; B60R 1/072; G02B 7/182; G02B 7/198
  USPC ................... 248/219.1, 475.1, 476, 477, 479; 359/900, 872
  See application file for complete search history.

(56) References Cited

U.S. PATENT DOCUMENTS

| | | | | |
|---|---|---|---|---|
| 1,932,483 | A | * | 10/1933 | Ritz Woller ................. 248/298.1 |
| 2,319,557 | A | * | 5/1943 | Ritz-Woller ............... 248/279.1 |
| 4,306,701 | A | * | 12/1981 | Nierhaus et al. .............. 248/479 |
| 4,909,619 | A | * | 3/1990 | Eifert ............................. 359/876 |
| 5,025,543 | A | * | 6/1991 | Byers et al. .................... 29/401.1 |
| 5,028,029 | A | * | 7/1991 | Beck et al. ..................... 248/479 |
| 5,039,055 | A | * | 8/1991 | Lempelius ..................... 248/480 |
| 5,069,410 | A | * | 12/1991 | McKee ........................ 248/475.1 |
| 5,227,924 | A | * | 7/1993 | Kerper ........................... 359/875 |
| 5,513,048 | A | * | 4/1996 | Chen .............................. 359/881 |
| 7,198,378 | B2 | * | 4/2007 | Lang et al. ..................... 359/872 |
| 7,207,684 | B2 | * | 4/2007 | Huprikar et al. .............. 359/841 |
| 7,866,835 | B2 | * | 1/2011 | Liu ................................ 359/844 |

FOREIGN PATENT DOCUMENTS

EP     0 090 909 A2    10/1983
EP     0 590 510 A1    6/1994

\* cited by examiner

*Primary Examiner* — Ricky D Shafer
(74) *Attorney, Agent, or Firm* — Dority & Manning, P.A.

(57) ABSTRACT

A tubular frame section directly or indirectly attached to the vehicle and a mirror unit, attached by a clamping connection to the tubular frame section, whereby the mirror unit in interconnection to an adapter is attached to the tubular frame section. The adapter, which is torque-proof, displacement-resistant and coupleable with a fastening section of the mirror unit, can balance the diameter difference between the fastening section of the mirror unit and the tubular frame section. An inner contour of the adapter is designed so that the adapter can be connected in a form lock for the accurate attachment of the mirror unit to the tubular frame section in such a way that a longitudinal movement of the adapter on the tubular frame section is hindered and the degrees of freedom of the adapter are at least limited in the circumferential direction of the tubular frame section.

16 Claims, 7 Drawing Sheets

ADAPTER FOR PRECISE AND ACCURATE ATTACHMENT OF A MIRROR UNIT TO A SUPPORT ARM

BACKGROUND OF THE INVENTION

1) Field of the Invention

The present invention relates to an exterior mirror design for motor vehicles, particularly commercial vehicles. More specifically, the invention is directed to an adapter for a precise and accurate attachment of a mirror unit to a support arm, as well as, a procedure for the precise and accurate attachment of the mirror unit.

2) Description of Related Art

Vehicle mirrors typically consist of a mirror head with at least one mirror. The mirror can be either fixed or adjustable in housing and mounted directly into a frame. Furthermore, an adjusting device may be provided in the housing for the manual or motor driven adjustment of the mirror in relation to the housing, mirror heating elements, etc. A different adjustment concept allows for the entire mirror head to be adjusted by way of an interposed adjustment unit.

The mirror head or mirror head adjustment unit is usually attached by way of a clamping connection to an essentially vertical running tubular frame, which is attached either with a holding arm or directly onto the vehicle and is particularly adjustable and/or hinged.

Clamping devices are known from EP 0 090 909 A2 and EP 0 590 510 A1, which have rhombic openings and can, therefore, be attached to tubular frame systems with different diameters by way of a bolted connection. These clamps are usually made of metal and are equipped with a welded thread and rubber pads in the rhombic opening. This type of attachment to tubular frames with different diameters, however, is to the detriment of its stability because a frictional engagement is only achieved at four points and/or lines between the generally circular tubular frame when assimilated into the rhombic opening and onto the clamping parts. Furthermore, the attachment does not allow a defined positioning of the mirror head on the tubular frame, neither in the axial nor circumferential direction.

DE 20 2006 019 379 U1 shows a mirror mount with a mirror head that is tightly clamped to an extruded profile, whereby the extruded profile has longitudinal grooves into which the corresponding projections on the mirror head engage. Thereby, the mirror head can be attached to the extruded profile in different angular positions. This optional positioning of the mirror head in the circumferential direction requires a great amount of production-related effort because the attachment of the mirror head is only possible in each case on a predetermined extruded profile and, therefore, the mirror head and extruded profile must always be coordinated. Incidentally, this attachment does not allow a predefined positioning in the longitudinal direction of the tubular frame.

It is therefore an object of the present invention to create an exterior mirror design for motor vehicles, which enables a precise and accurate attachment to tubular frame systems of different diameters using as many identical parts as possible.

SUMMARY OF THE INVENTION

According to the invention, the exterior mirror design has a tubular frame section attached directly or indirectly to the vehicle as well as a mirror unit attached by a clamping connection to the tubular frame section, whereby the mirror unit in interconnection to an adapter is attached to the tubular frame section. Thereby, the adapter, which is torque-proof, displacement-resistant and coupleable with a fastening section of the mirror unit, balances the diameter difference between the fastening section of the mirror unit and the tubular frame section and allows for the accurate form-locking attachment of the mirror unit with the tubular frame section in such a way that on one hand, a longitudinal movement of the adapter on the tubular frame section is prevented and on the other hand the degrees of freedom of the adapter in the circumferential direction of the tubular frame section are at least limited.

In one embodiment, the interconnection of the adapter does not only allow for the attachment of the one and the same mirror unit to tubular frame systems of different diameters, but also a predefined positioning of the mirror unit in the longitudinal and circumferential direction without the use of additional parts or devices. The adjustment to the different tubular frame systems occurs with the selection of a corresponding adapter, which balances the diameter difference between the mirror unit and tubular frame section. In doing so, the outer diameter and the outer contour of the adapter, which form the interface to the mirror unit, can be kept equal and only the inner diameter and/or contour must be adjusted to the respective tubular frame system. In doing so, easier installation and the use of identical parts are both made possible.

For the fixed attachment of the adapter to the tubular frame section, either the adapter or the tubular frame section can have at least one projection, which engages into a corresponding recess in the tubular frame section or adapter. This forms a lock between the adapter and tubular frame section ensuring that the adapter is torque-proof and displacement-resistant in relation to the tubular frame section.

The exterior mirror design according to the invention can be constructed more efficiently in that the tubular frame section or adapter has two recesses arranged in the circumferential direction, which allow two predetermined positions of both parts relative to each other and preferably define one angle, which significantly corresponds to a differential angle between a mounting position of a driver side mirror and a mounting position of a passenger side mirror on the tubular frame section in reference to the line of site, whether for a left or right-side operated vehicle. Therefore, it is possible to produce identical tubular frame sections independent of the mounting side onto which the mirror unit can be attached at either position using the adapter. This applies equally to left and right-side controlled vehicles.

Instead of two recesses, an elongated hole or connecting link running in the circumferential direction may be provided, which has attachment points that define the aforementioned positions of the adapter relative to the tubular frame section. The use of a connecting link instead of two recesses that are complimentary to the projection is practical in that the adapter is considerably easier to attach because a larger opening is available for inserting the projection and the adapter or tubular frame section must only be twisted in one direction or the other until the stopping point for it to be clamped tightly to the tubular frame section.

In order to achieve a torque-proof and displacement-resistant coupling of the adapter with the mirror unit fastening section, a form lock can also be realized on the interface between the adapter and mirror unit using one or more corresponding projections and recesses.

In order to be able to control and supply a motor driven mirror drive, heating device etc. with power, the adapter can have a recess that allows electrical and electronic lines to be led over the tubular frame section to the respective unit.

The adapter is preferably formed of two half shells, which encompass the tubular frame section from two sides. Even if a one-sided adaptation is possible, the use of two opposite facing half shells is practical in that the mirror unit can always be attached in the same position with regard to the axis of the tubular frame section, and namely independent of the diameter of the tubular frame section. Incidentally, both half shells can be easily inserted between the tubular frame section and mirror unit.

Even more practical, the adapter and two half shells are assimilated into combinable attachment pieces in the fastening section of the mirror unit and can be clamped thereby to the tubular frame section.

The exterior mirror design according to the invention can also have a cover in order to meet the aerodynamic requirements of such an outside mirror. According to the invention, an attachable and form-locking cover is provided, which covers both fastening parts, surrounds the adapter and terminates flush with a base section of the adjustment unit, which is attachable to one of the two fastening parts.

The task underlying the invention is also accomplished according to a corresponding procedure for the precise and accurate attachment of a mirror unit, which achieves an exterior mirror design as described herein below.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

The preceding object of the invention, as well as, other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

Figure 1:
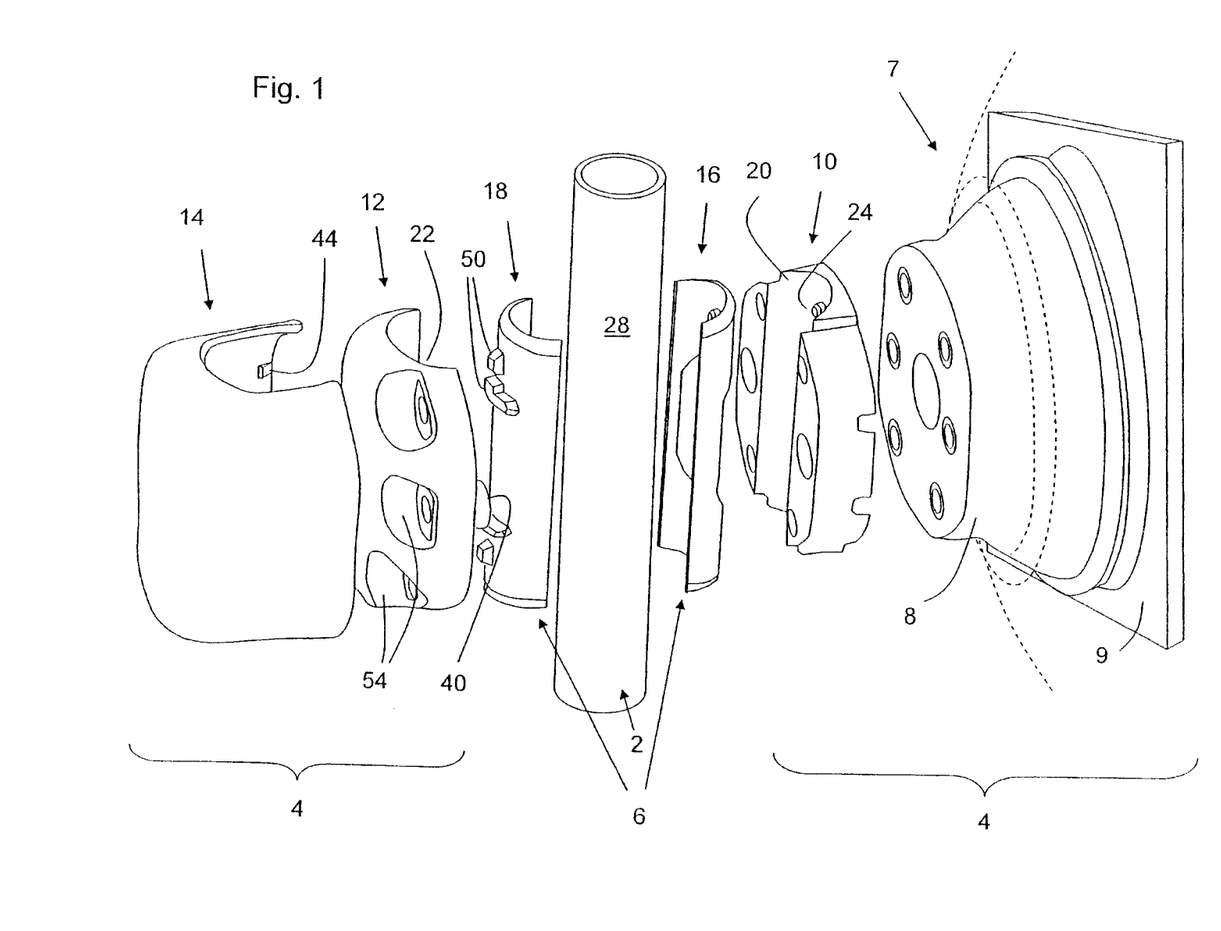
FIG. 1 shows an exploded view of the exterior mirror design according to the invention.

With reference to the drawings, the invention will now be described in more detail. Referring to FIG. 1, a perspective exploded view of a mirror unit 4 is shown fastened to a support arm illustrated as tubular frame section 2 in interconnection to an adapter 6. The tubular frame section 2 is part of a partially shown tubular frame, which is fastened indirectly or directly to the exterior of a motor vehicle. The mirror unit 4 includes a (indicated with dotted line) mirror head with a housing, a mirror carrier plate and a mirror, an interposed adjustment unit 7 with a base section 8 and an adjusting platform 9, on which the mirror carrier plate is fastened, a fastening section defined by a first fastening part 10 and a second fastening part 12, and a cover 14. The adjustment unit can be a manually operable or electrically powered adjustment unit.

When the second fastening part 12 is attached to the base section 8 using multiple bolted connections in interconnection with the first fastening part 10, two half shells 16 and 18 that form the adapter 6, which surround the tubular frame section 2 from two opposite sides, are pressed against the tubular frame section 2. The first fastening part 10 has a semi-circular recess 20, into which the first half shell 16 is assimilated. Furthermore, the second fastening part also has a semi-circular recess 22 for the assimilation of the other half shell 18. Two projections or pins 24 are provided in the recess 20 of the first fastening part 10, which in an attached state, engage into two corresponding recesses 25 of the first half shell 16 as shown in detail in FIGS. 2 and 3.

The first half shell 16 also has an inner circumferential surface 26, which is adjusted to an outer circumferential surface 28 of the tubular frame section 2, particularly in reference to its curvature. Furthermore, projections 30 are provided on the inner circumferential surface 26 of the first half shell 16, which engage into corresponding recesses 60, 62, 64 (see FIG. 10) on the tubular frame section 2. The form lock between the adapter 6 and the neighboring fastening parts 10, 12 can also be based on a "rib-nuf" principle, as long as a protruding geometry on the adapter 6 engages internally into a geometry or aperture in the tubular pipe section 2 recessed for this purpose in order to determine the position.

Figure 2:
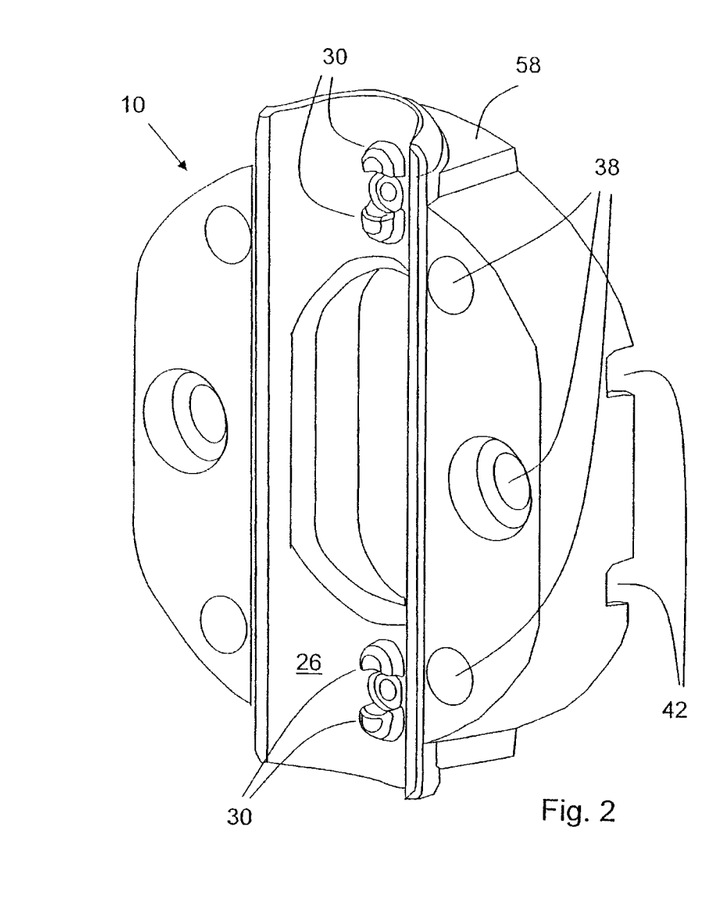
FIG. 2 shows a first fastening part of a mirror unit together with a first adapter according to the invention.
Figure 3:
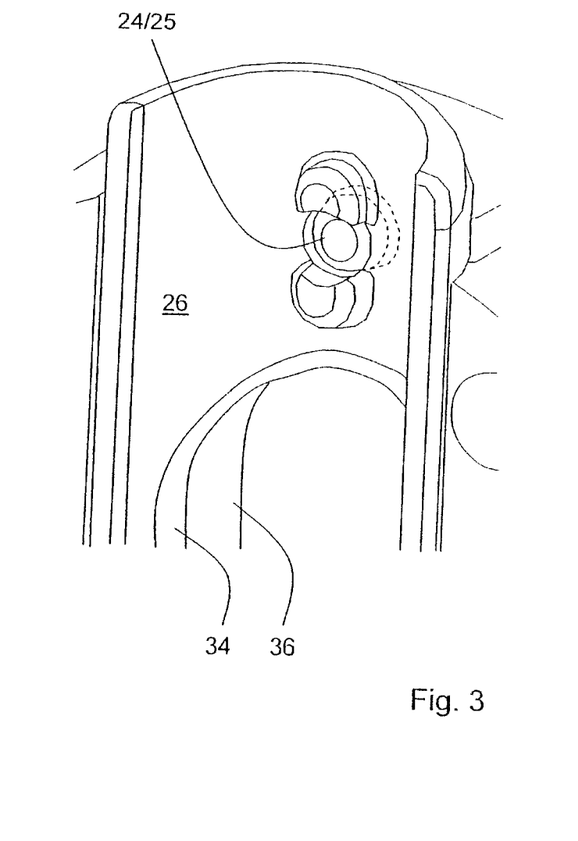
FIG. 3 shows an enlarged partial view of FIG. 2.

The first fastening part 10 and the first half shell 16 have identical passages 34 and 36 through which the lines of an electronic unit potentially provided in the adjustment unit 8, 9 can be led over the tubular frame section 2, such as, for example, a motor driven mirror drive, heating elements, etc. As shown in FIG. 2, the first fastening part 10 has multiple through holes 38 for the screws necessary for the clamping connection, whereby two of these through holes can assimilate the centering pins 40 provided on the second fastening part 12 (see FIG. 1 and FIG. 4).

The circumferential side of the first fastening part 10 has notches 42 on the side facing the base section 8 into which corresponding engagement pins 44 (see FIG. 1) provided on the inner circumferential surface of the cover 14 can engage in form lock for a detachable fastening.

Figures 4, 5A, 5B:
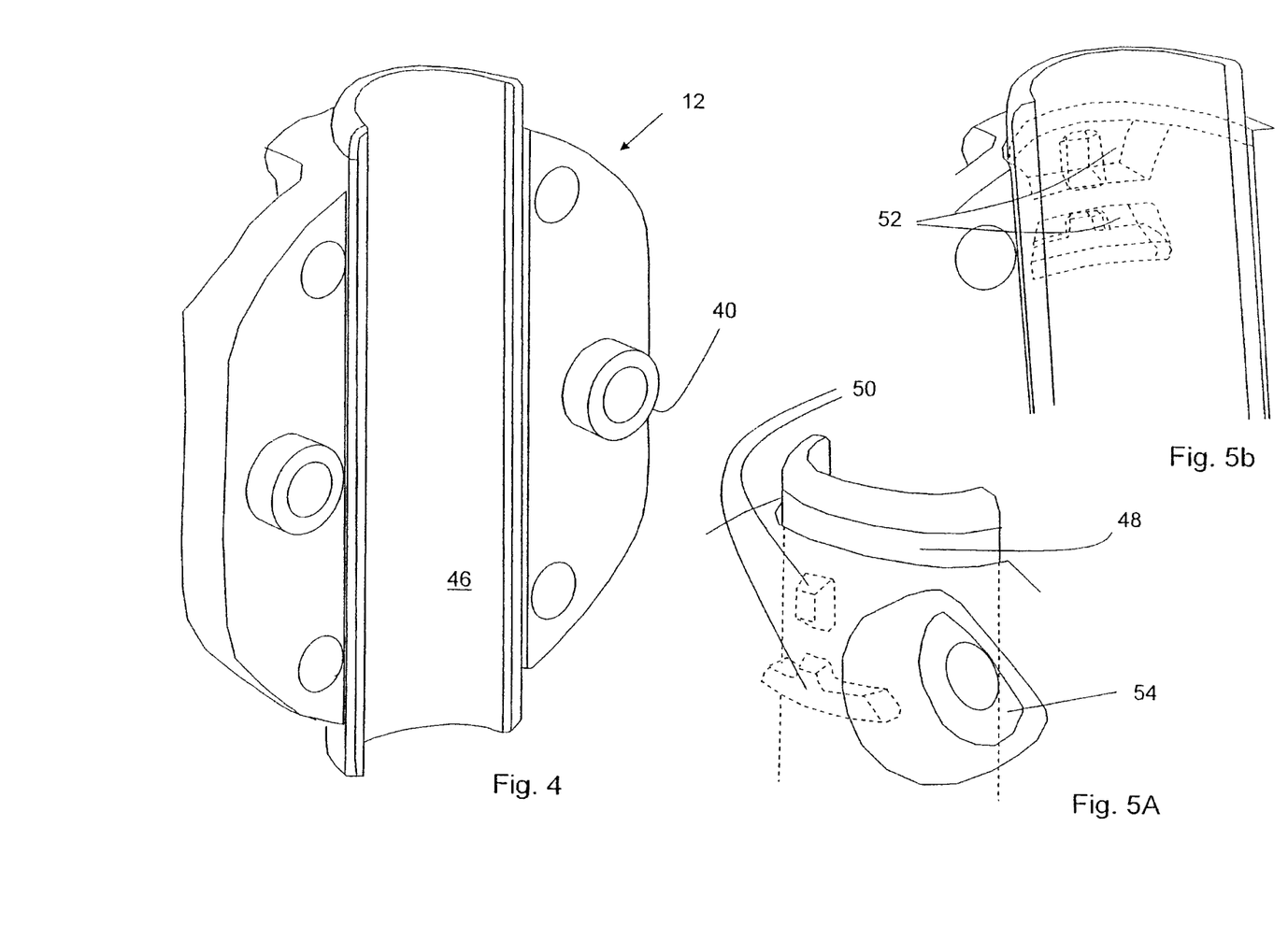
FIG. 4 shows a second fastening part of the mirror unit together with a second adapter according to the invention.
FIG. 5A shows an enlarged partial view of FIG. 4.
FIG. 5B shows an enlarged partial view of FIG. 4.

FIG. 4 shows the second fastening part 12 with the second half shell 18 inserted into the recess 22. The second half shell 18 has, in turn, an inner circumferential surface 46 that corresponds to the outer surface 28 of the tubular frame section 2, which has no notches or projections whatsoever. The second half shell 18, however, has projections 50 on its outer circumferential surface 48, which engage into corresponding recesses 52 on the inner side of the second fastening part in such a way that the second half shell 18 is neither displaceable nor twistable in relation to the second fastening part 12 in the position shown in FIG. 4.

The second fastening part 12 has countersinkings 54 (see FIG. 1) on the outer circumferential surface, which correspond to the bolted connection.

Figure 6:
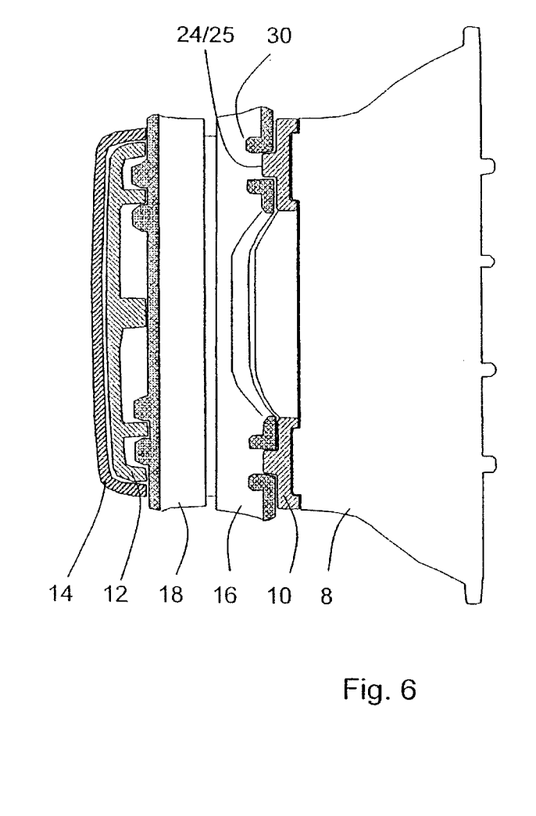
FIG. 6 shows a vertical cross section view of the attached mirror unit according to the invention.

FIG. 6 shows a vertical cross section view of the attached mirror unit 2 together with adapter 6 from which the form-locking connections emerge between the first half shell 16 and the first fastening part 10 on the one hand and the second half shell 18 and the second fastening part 12 on the other hand. The projections 30 on the inner circumferential surface 26 of the first half shell 16 create the form lock with the tubular frame section not shown.

Figure 7:
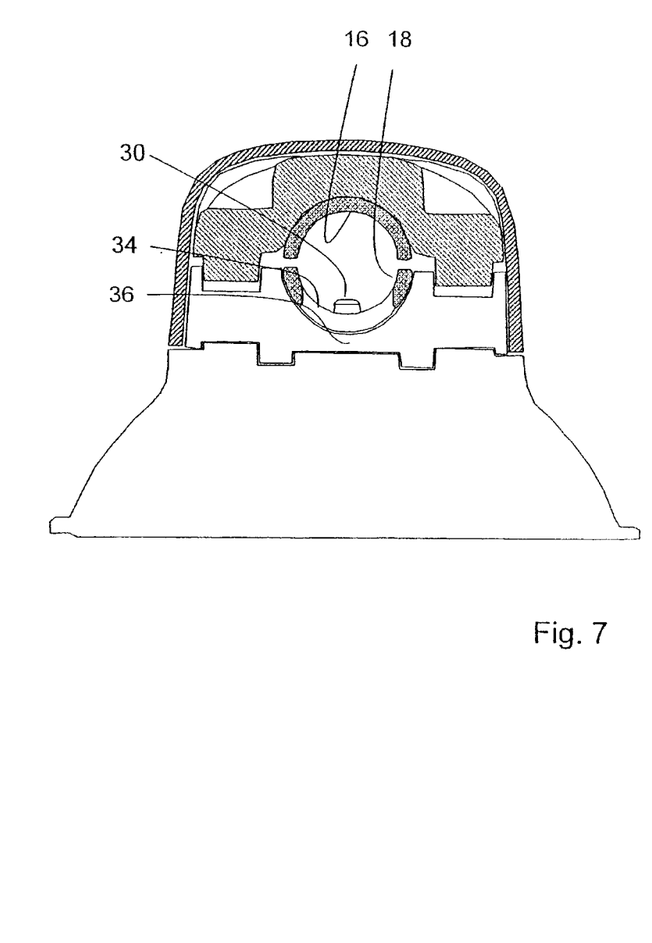
FIG. 7 shows a horizontal cross section view of the attached mirror unit according to the invention.

FIG. 7 shows a horizontal cross section view of the attached mirror unit together with the adapter 6 and both half shells 16 and 18. As shown in this figure, the two half shells 16 and 18 do not form a complete ring and are spaced apart from each other to define a clamping gap in order to be able to transfer the clamping force applied by way of the bolted connection of the fastening parts to the tubular frame section 2.

In FIG. 7, the two passages 34 and 36 are also seen in the first fastening part and first half shell, which lead to an electrical mirror drive contained within the adjustment unit 8, 9 (not shown).

Figure 8:
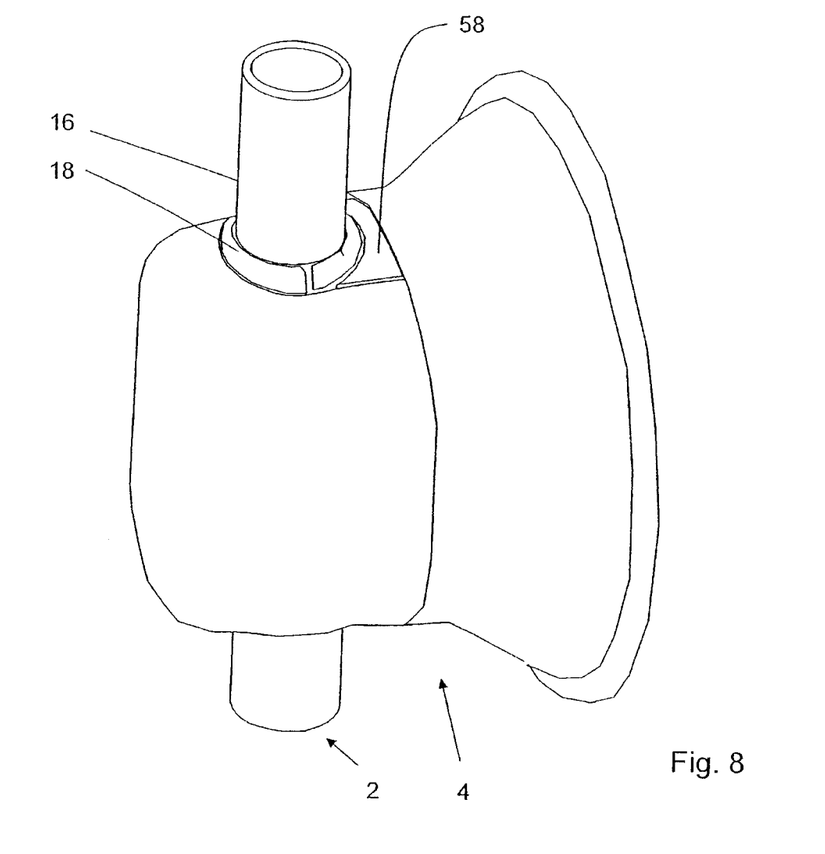
FIG. 8 shows a perspective view of the mirror unit fastened to the tubular frame section according to the invention.

FIG. 8 shows a perspective view of the mirror unit 4 that is fastened to the tubular frame section 2 in interconnection of the two half shells 16 and 18. Here, the cover 14, which is attached by snapping into place in the first fastening part 10, covers both fastening parts 10 and 12, surrounds both half shells 16 and 18 and terminates flush with the base section 8, thus forming an aerodynamic unit. The first fastening part 10 has on its circumference in the longitudinal direction, two shoulder portions 58, which complete the cover 14 "behind" the tubular frame section and terminate flush with the base section 8 and the cover 14.

The above description of the exterior mirror design according to the invention is valid for a right and left outside mirror. The difference in assembly is described in reference to the following figures.

Figure 9:
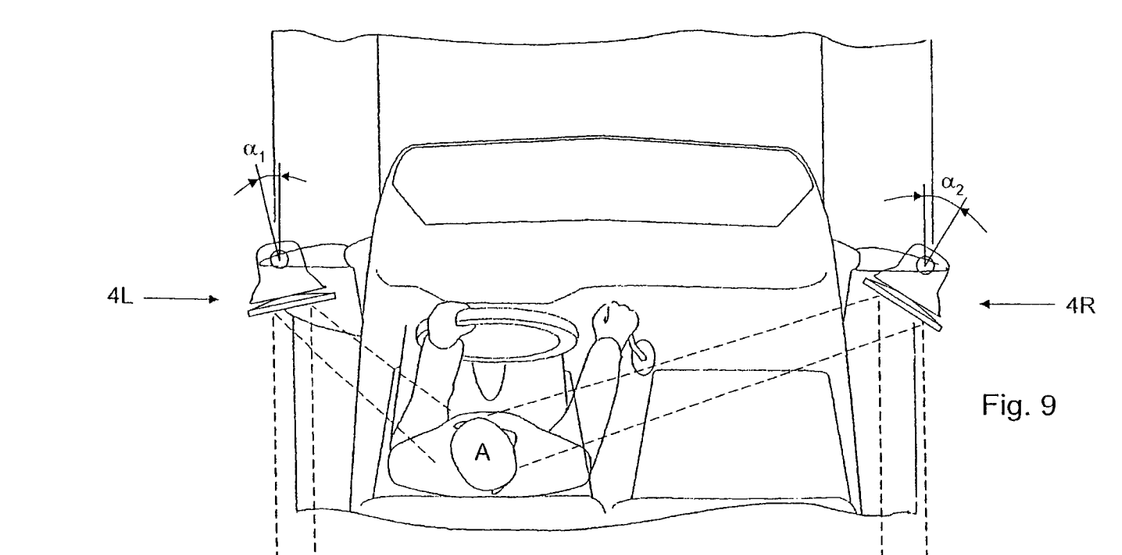
FIG. 9 shows a schematic top view of a vehicle with a left and right exterior mirror design according to the invention.
Figure 10A:
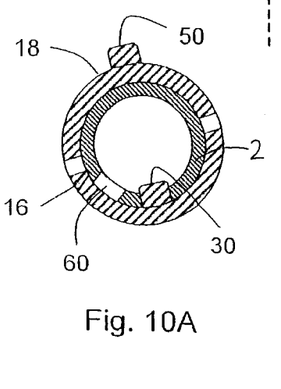
FIGS. 10A and 10B show cross section views of the adapter and tubular frame section of the left and right exterior mirror design according to a first embodiment of the invention.
Figure 10B:
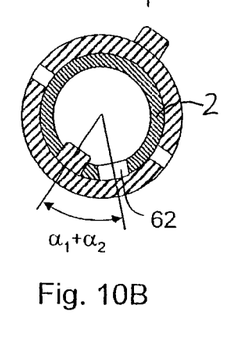

FIG. 9 shows a top view with a left and right exterior mirror design. As apparent from FIG. 9, the two mirrors 4L, 4R left and right have different orientations due to the different perspectives regarding the driver's line of site to both mirrors. In order to be able to revert back to identically produced mirror units and tubular frames for driver and passenger side exterior mirror designs, two recesses 60 and 62 (FIGS. 10A and 10B) are provided in the tubular frame section 2 into which the projections 30 on the inner circumferential surface 26 of the first half shell 16 can engage in a form lock in order to be able to monitor the adapter 6 and, therefore, the mirror unit 4 in two relative positions on the tubular frame section 2. The angle between the two predetermined relative positions correspond here to the differential angle ($\alpha_1+\alpha_2$) between the fastening position of the driver side mirror 4L and the fastening position of the passenger side mirror 4R to the tubular frame section 2. FIGS. 10A and 10B show the two different fastening positions for a left and right outside mirror 4L, 4R.

Figure 10C:
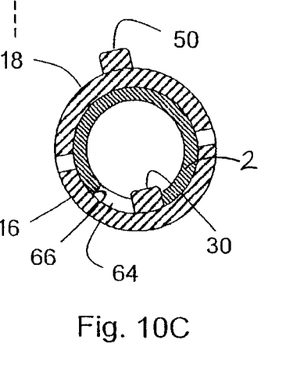
FIGS. 10C and 10D show cross section views of the adapter and tubular frame section of the left and right exterior mirror design according to a second embodiment of the invention.
Figure 10D:
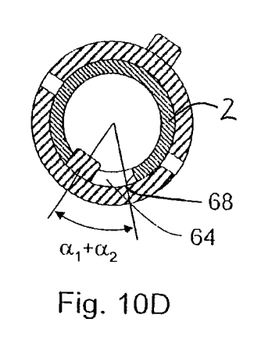

Instead of the two recesses 60 and 62 shown in FIGS. 10A and 10B, a connecting link 64 like that seen in FIGS. 10C and 10D is provided, which has attachment points 66 and 68 that correspond to the two predetermined relative positions, so that by inserting and turning the adapter in one direction or the other until the respective stopping point 66 or 68, two predefined fastening positions are also defined for a left and right outside mirror 4L, 4R.

Figure 11:
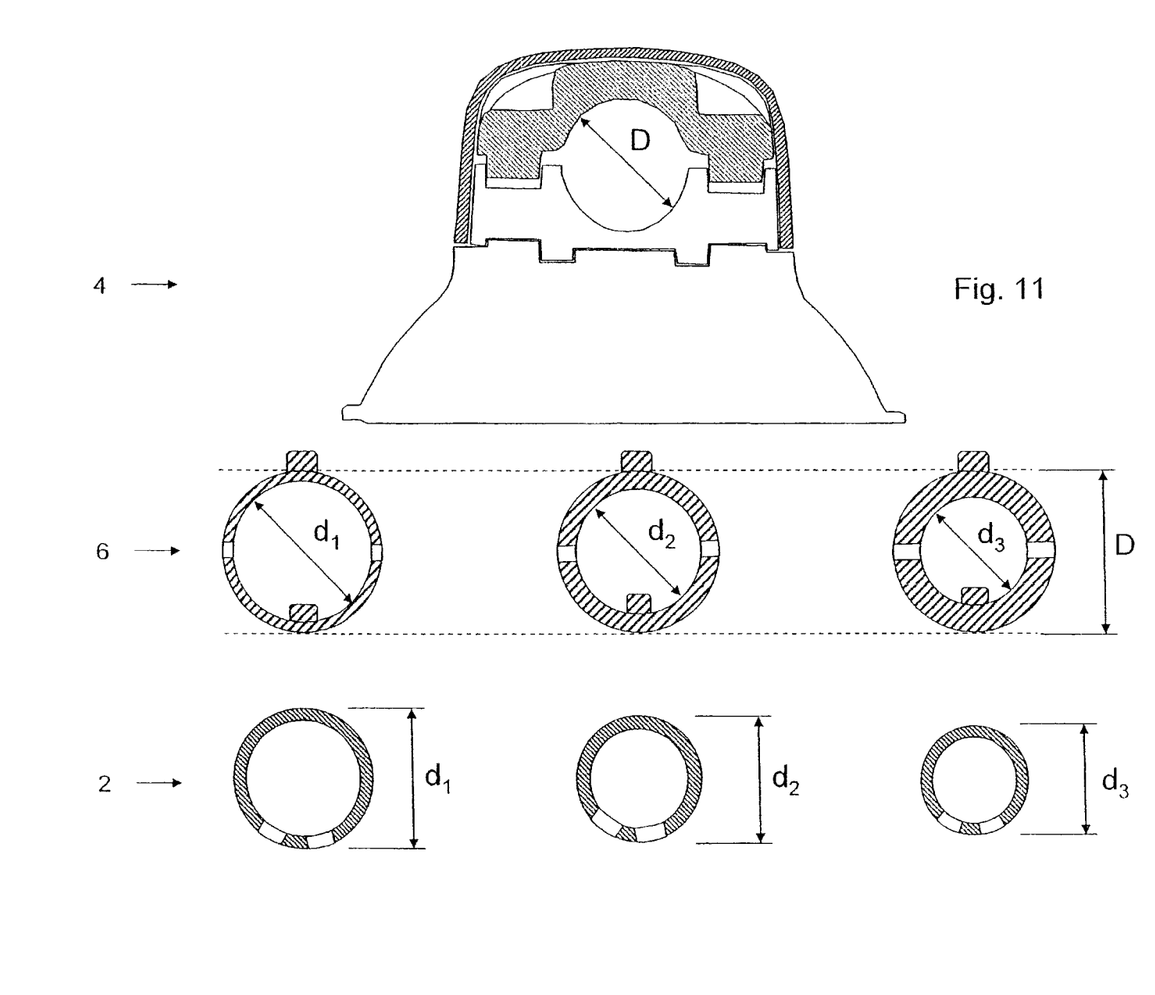
FIG. 11 shows a schematic diagram of a modular system of an exterior mirror design according to the present invention.

FIG. 11 shows a schematic diagram of the exterior mirror design according to the invention, which is attachable using as many identical parts as possible according to a modular construction kit principal. Depending, therefore, on the cross section of the tubular frame section 2, a compatible adapter 6 can be selected that has a wall strength that corresponds to a difference between the diameter D of both recesses 20 and 22 of the first and second fastening parts 16, 18 and the outer diameter $d_1$, $d_2$, $d_3$ of the tubular frame section 2. The inner diameter $d_1$, $d_2$, $d_3$ and potentially the inner contour of the adapter 6 have different designs while the outer diameter and outer contour, which are adjusted to a specific mirror unit 4, remain the same. The mirror unit 4 can be subsequently attached to the respective tubular frame section in interconnection with the corresponding compatible adapter 6 that is selected, whereby it is to be observed when assembling that the projections 30 of the first half shell 16 engage, depending on the fastening side of the mirror unit 4, into the corresponding recess 60 or 62 provided for this purpose.

The present invention is, of course, not limited to the embodiment just described, but also comprises modifications for a professional. For example, the tubular frame section 2 can be provided with a projection, which engages into one or more recesses provided on the corresponding adapter 6. The same is valid for the interface between the adapter and the first and second fastening parts 10, 12. Furthermore, the first fastening part 12 can be constructed with the base section 8 as one part.

For the shown embodiment, the mirror head is directly fastened to the tubular frame section 2 by way of an adjustment unit 8, 9. The mirror head can certainly also be attached indirectly to the fastening part 12 or constructed together with it as one piece.

Instead of projections and recesses, inner and outer contours are also conceivable, which effectuate a torque-proof and displacement-resistant coupling of the respective parts.

Of course, it is also possible with the adapter according to the invention to attach mirror units with different fastening sections to similar or different tubular frame systems, i.e. not only balance out differences in the tubular frame systems, but also differences in the mirror units in order to allow for their precise and accurate attachment.

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly comprising:
   a mirror unit having a fastening section for clamping around a tubular frame section adapted to mount directly or indirectly on a vehicle exterior, the mirror unit further having an adjustment unit connectable to and in contact with the fastening section;

an adapter being disposed between said fastening section and said tubular frame section for interconnecting said mirror unit and said tubular frame section;

wherein said adapter interlocks with said fastening section and accommodates a diameter difference between said fastening section and said tubular frame section so that a given said fastening section can be used with said tubular frame section of various diameters, and wherein said adapter interlocks with said tubular frame section to limit the degrees of freedom of said adapter in moving circumferentially around said tubular frame section to predefined positions and to prevent longitudinal movement on said tubular frame section so that said adapter is torque-proof and displacement resistant on said tubular frame section.

2. The mirror assembly of claim 1 wherein said adapter includes at least one projection, which engages into a corresponding recess in said tubular frame section.

3. The mirror assembly of claim 2 wherein said tubular frame section includes two circumferentially spaced recesses, whereby said two recesses define two predetermined relative attachment positions for said adapter to engage said tubular frame section so that an angle between the two predetermined relative attachment positions corresponds generally to a fastening position for a driver side mirror and a fastening position for a passenger side mirror on the tubular frame section in reference to a line of sight.

4. The mirror assembly of claim 2 wherein opposing ends of said recess in a circumferential direction in said tubular frame section define two attachment points, wherein said attachment points define two predetermined relative attachment positions for said adapter to engage said tubular frame section so that an angle between the two predetermined relative attachment positions corresponds generally to a fastening position for a driver side mirror and a fastening position for a passenger side mirror on the tubular frame section in reference to a line of sight.

5. The mirror assembly of claim 1 wherein said fastening section of the mirror unit includes at least one projection that engages into a complimentary recess in said adapter.

6. The mirror assembly of claim 5 wherein said fastening section of the mirror unit includes a first fastening part and a second fastening part cooperating to clamp around said tubular frame section and between which said adapter is disposed.

7. The mirror assembly of claim 6 including a semi-circular recess extending along each of said first fastening part and said second fastening part, wherein said adapted and said tubular frame section are received into said semicircular recess.

8. The mirror assembly of claim 7 wherein said at least one projection is disposed in said semi-circular recess of each said first fastening part and said second fastening part for engaging said adapter.

9. The mirror assembly of claim 5 wherein said adapter being formed of two separate half shells that engage said tubular frame section from opposite sides.

10. The mirror assembly of claim 9 wherein a clamping gap is disposed between said half shells of said adapter to transfer a clamping force of said fastening section to said tubular frame section by allowing said half shells to be drawn together during clamping to engage said tubular frame section.

11. The mirror assembly of claim 1 wherein said mirror unit including an attachable cover, which surrounds said fastening section and said adapter, which terminates flush with said adjustment unit carried by said fastening section.

12. The mirror assembly of claim 11 wherein said fastening section includes a shoulder portion extending between said tubular frame section and said adjustment unit aligned flush with said cover to provide a generally uniform surface between said cover, said fastening section and said mirror head adjustment unit.

13. The mirror assembly of claim 1 wherein said adapter has uniform exterior side dimensions and contours while providing different inner dimensions and inner contours as appropriate for attaching identical mirror units to various tubular frame sections of different diameters.

14. A method for the precise and accurate attachment of a mirror unit to a tubular frame section directly or indirectly attached to a motor vehicle, comprising the steps of:

selecting an adapter according to a diameter difference between a fastening section of the mirror unit and the tubular frame section, the mirror unit comprising the fastening section and an adjustment unit connectable to and in contact with the fastening section;

reducing said diameter difference by inserting the selected said adapter into said fastening section of the mirror unit; and attaching said mirror unit to said tubular frame section, so that a projection provided on said adapter engages into a corresponding recess in said tubular frame section or a projection provided on the tubular frame section engages into a corresponding recess on the adapter.

15. The method of claim 14 wherein said adapter or the tubular frame section is provided with two recesses in a circumferential direction in order to be able to connect the adapter and the tubular frame section in two predetermined relative attachment positions, whereby an angle between the two predetermined relative attachment positions generally corresponds to a fastening position for a driver side mirror and a fastening position for a passenger side mirror on the tubular frame section in reference to a line of sight, with the further step of:

attaching said mirror unit to said tubular frame section so that said projection engages into one or another of said recess.

16. The method of claim 14 wherein said adapter or the tubular frame section is provided with a connecting link extending in a circumferential direction defining two attachment points, whereby said attachment points define two predetermined relative attachment positions of said adapter and said tubular frame section, whereby an angle between the two predetermined relative attachment positions generally corresponds to a fastening position for a driver side mirror and a fastening position for a passenger side mirror on said tubular frame section in reference to a line of sight, with the further step of:

attaching said mirror unit to said tubular frame section so that said projection is located at one or another of said attachment points of the connecting link.

* * * * *